United States Patent Office 2,905,609
Patented Sept. 22, 1959

2,905,609

PROCESS FOR THE MANUFACTURE OF CHLOROFLUOROCYCLOHEXANES

Angelo Germano, Lausanne, Switzerland, assignor to Solvay & Cie., Brussels, Belgium, a Belgian company No Drawing. Application August 7, 1956
Serial No. 602,501

Claims priority, application Belgium August 27, 1955

5 Claims. (Cl. 204—163)

The present invention relates to a new process for the manufacture of chlorofluorocyclohexanes, particularly hexachloromonofluorocyclohexane.

It is known that hexachloromonofluorocyclohexane has already been produced by additive chlorination of monofluorobenzene according to the reaction $$C_6H_5F + 3Cl_2 \rightarrow C_6H_5Cl_6F$$

It has now been found that chlorofluorocyclohexanes can be produced by direct fluorination of chlorocyclohexanes.

According to the invention chlorofluorocyclohexanes are obtained by reacting elementary fluorine with chlorocyclohexanes in the presence of an inert solvent and under the catalytic action of actinic rays, γ-rays and/or organic peroxides.

An inert solvent there may advantageously be used carbon-tetrachloride in which the chlorocyclohexanes are dissolved. It is also possible to use an excess of chlorocyclohexane with regard to its solubility in the inert solvent, this excess then being in a finely divided suspension in the inert solvent. Instead of carbon tetrachloride a Freon or any other inert solvent may be used under the working conditions.

The fluorine can be used in the pure state, although the reaction is more easily controllable if the halogen is diluted in an inert gas such as ntrogen. The ultraviolet radiations are very suitable as actinic rays. The reaction is likewise catalyzed by γ-rays, for example by radiations emitted by radioactive isotopes such as cobalt 60 and to a lesser extent by organic peroxides.

As raw material there is advantageously used the residual isomers of the manufacture of the γ-isomer of hexachlorocyclohexane, for example of the α-isomer or of mixtures of isomers rich in α-isomer. As starting material there may also be used chlorocyclohexanes obtained by substitutive chlorination of cyclohexane. The direct fluorination is, however, applicable to all isomers of hexachlorocyclohexane and particularly to the technical product obtained by additive chlorination of benzene. The chloro-substituted derivatives of hexachlorocyclohexane, hepta, octo and monochlorocyclohexanes may also be used.

The absorption of the fluorine in the reaction mixture takes place even at ambient temperature, but the reaction speed is increased at more elevated temperature. At higher temperatures, for example at the boiling temperature under reflux, secondary reactions can occur with the evolution of chlorine. The more interesting results are obtained by working at a temperature of between 20 and 50° C.

The fluorine content of the fluorination products of chlorocyclohexanes varies essentially with the rate of fluorination. By keeping the molecular ratio of fluorine and chlorocyclohexanes below 1, mono-fluorinated compounds are preferably obtained. In order to obviate the formation of higher fluorinated compounds, it is advantageous to carry out the process in a continuous manner in a fluorination medium whose concentration is kept constant by continuous elimination of a portion of the reaction products.

Example 1

150 grams of the α-isomer of hexachlorocyclohexane dissolved in 800 millilitres of carbon tetrachloride are placed in a glass cylinder provided with a vibro-mixer, a copper reflux condenser and irradiated by an ultraviolet light lamp (PL-313 Hanau). The glass cylinder is externally surrounded by aluminium foils serving as a reflector.

The fluorine diluted by nitrogen (fluorine concentration 27 percent by volume) is introduced at the rate of 380–390 millilitres per minute with the aid of a glass tube whose end is above the plate of the vibrator so as to ensure a fine distribution of the gas in the solvent. The temperature is kept at 20° C. and the operation is stopped after 3 hours.

After removing the solvent by distillation, a clear oil is obtained having a strong odour from which the unchanged isomer slowly separates out. After filtration, 115 grams of an oil are obtained having the following percentage composition: Cl 64.0%, F 10.4%, mobile Cl 31.1%.

A complex mixture is concerned which by vacuum distillation in a Todd column [Anal. chem. 17, 175 (1945)], yields various fractions consisting of pentachlorotrifluorocyclohexanes, hexachlorotrifluorocyclohexanes, hexachlorodifluorocyclohexanes, heptachlorodifluorocyclohexanes, hexachloromonofluorocyclohexanes and heptachloromonofluorocyclohexanes.

Example 2

A solution of 160 grams of the α-isomer of hexachlorocyclohexane in 500 millilitres of carbon tetra-chloride produced under reflux is placed in a 3-neck-flask provided with a vibro-mixer and a reflux condenser. The heating is effected by an ultra-violet lamp whose active part is applied to the external wall of the flask. The whole is placed into a semi-spherical metallic reflector. When the reaction mixture boils, the fluorine diluted by nitrogen (fluorine content 36 percent by volume) is introduced at the rate of 325 millilitres per minute within an hour and a half. The reaction is accompanied by a strong evolution of chlorine and hydrochloric acid. After cooling the solvent is removed by distillation. From the residue 108 grams of the unreacted α-isomer of hexachlorocyclohexane are separated, the oily products are contaminated with hexachlorethane and hexachlorobenzene.

Example 3

150 grams of the α-isomer of hexachlorocyclohexane of which a portion remains in suspension in 500 millilitres of carbon tetrachloride, are introduced into the apparatus described in Example 1. The reaction is effected as described in that example but limiting the introduction of fluorine diluted to 34 percent to a rate of 250 millilitres per minute during only one hour. After the evaporation of the solvent and filtration of the unchanged α-isomer, 30 grams of an oil are obtained containing 50 percent of hexachloromonofluorocyclohexane and 25 percent of hexachlorodifluorocyclohexane.

Example 4

The experiment is carried out in a semi-continuous manner in the apparatus described in Example 1, the glass cylinder comprising a plunging tube for siphoning off the contents.

800 grams of the α-isomer of hexachlorocyclohexane are suspended in 1800 millilitres of carbon tetrachloride. The fluorine diluted to a concentration of 27 percent by volume is introduced at a rate of 200 millilitres per minute. The temperature is kept at 40° C. After 30 to 40 minutes, the operation is interrupted and the whole is cooled to about 20° C. with stirring. During the cooling, most of the α-isomer crystallizes. The solution is then decanted and siphoned off. After distillation the solvent is re-cycled to the reactor.

This operation is repeated 14 times. From the combined fractions the solvent is completely removed, first at ordinary pressure, then under vacuum. The syrupy mass thus obtained is filtered through a Büchner funnel in order to separate the precipitated α-isomer. 392 grams of an oil $n_D^{20}$ 1.5347 are obtained whose percentage composition substantially corresponds to that of hexachloromonofluorocyclohexane

| $C_6H_5Cl_6F$ | Cl | F | Mobile Cl |
|---|---|---|---|
| Calculated | 68.8 | 6.1 | 34.4 |
| Found | 67.2 | 5.8 | 34.1 |

Since 2.54 mols of fluorine were introduced during the operations, the theoretical quantity of hexachloromonofluorocyclohexane which could be prepared is 392 grams. The yield of the technical product is thus 100 percent.

The invention is not limited to the examples described and may be carried out in a continuous manner by the application of usual processes known by themselves.

I claim:
1. A process for the manufacture of chlorofluorocyclohexanes comprising reacting elementary fluorine with chlorocyclohexanes in the presence of at least one inert solvent and under the catalytic action of actinic rays produced by ultraviolet irradiation.
2. Process according to claim 1 wherein the inert solvent is carbon tetrachloride.
3. Process according to claim 1, wherein the fluorination is carried out at a temperature of between 20 and 50° C.
4. Process according to claim 1, wherein the fluorine is diluted by an inert gas.
5. Process for the manufacture of hexachloromonofluorocyclohexane comprising reacting elementary fluorine with one of the hexachlorocyclohexane isomers in the presence of an inert solvent and under the catalytic action of actinic rays produced by ultraviolet irradiation, the molecular ratio of fluorine to hexachlorocyclohexane being less than 1.

References Cited in the file of this patent
UNITED STATES PATENTS
2,806,817   Wolfe ---------------- Sept. 17, 1957